United States Patent
Schoor (10) Patent No.: US 10,401,486 B2
(45) Date of Patent: Sep. 3, 2019

(54) METHOD FOR LOCATING AN OBJECT USING AN FMCW RADAR

(71) Applicant: Robert Bosch GmbH, Stuttgart (DE)

(72) Inventor: Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 317 days.

(21) Appl. No.: 15/320,149

(22) PCT Filed: Apr. 24, 2015

(86) PCT No.: PCT/EP2015/058893
§ 371 (c)(1),
(2) Date: Dec. 19, 2016

(87) PCT Pub. No.: WO2015/197229
PCT Pub. Date: Dec. 30, 2015

(65) Prior Publication Data
US 2017/0131397 A1    May 11, 2017

(30) Foreign Application Priority Data

Jun. 27, 2014 (DE) .......................... 10 2014 212 390

(51) Int. Cl.
*G01S 13/58* (2006.01)
*G01S 7/35* (2006.01)
(Continued)

(52) U.S. Cl.
CPC ............ *G01S 13/584* (2013.01); *G01S 7/354* (2013.01); *G01S 7/414* (2013.01);
(Continued)

(58) Field of Classification Search
CPC ........ G01S 13/584; G01S 7/354; G01S 7/414; G01S 13/0209; G01S 13/34; G01S 13/931; G01S 13/536; G01S 13/9353
(Continued)

(56) References Cited

U.S. PATENT DOCUMENTS

| 6,856,280 B1 * | 2/2005 | Eder ...................... G01S 13/48 |
| | | 342/118 |
| 7,196,317 B1 * | 3/2007 | Meissner, II .......... A61B 5/1115 |
| | | 250/227.14 |

(Continued)

FOREIGN PATENT DOCUMENTS

| DE | 102009000468 A1 * | 8/2009 | ........... G01S 7/4008 |
| DE | 102009000468 A1 | 8/2009 | |

(Continued)

OTHER PUBLICATIONS

International Search Report dated Jul. 13, 2015, of the corresponding International Application PCT/EP2015/058893 filed Apr. 24, 2015.

*Primary Examiner* — Bernarr E Gregory
*Assistant Examiner* — Nuzhat Pervin
(74) *Attorney, Agent, or Firm* — Norton Rose Fulbright US LLP; Gerard Messina (57) ABSTRACT

A method for locating objects using an FMCW radar in which a ramp-shaped frequency-modulated radar signal is transmitted whose modulation pattern has a plurality of successive ramps having different gradients, received radar echoes are mixed down with the transmitted signal into a baseband, the baseband signal is recorded ramp-by-ramp and transformed into a respective spectrum, for each signal peak found in the spectrum, a noise estimation is carried out in order to distinguish between radar targets and noise or clutter, and by comparing the frequency positions of the mutually corresponding signal peaks in the spectra obtained for various ramp gradients, the distances and relative velocities of the radar targets are determined.

7 Claims, 5 Drawing Sheets

(51) Int. Cl.
*G01S 13/34* (2006.01)
*G01S 13/93* (2006.01)
*G01S 7/41* (2006.01)
*G01S 13/02* (2006.01)
*G01S 13/536* (2006.01)

(52) U.S. Cl.
CPC .......... *G01S 13/0209* (2013.01); *G01S 13/34* (2013.01); *G01S 13/931* (2013.01); *G01S 13/536* (2013.01); *G01S 2007/356* (2013.01); *G01S 2013/9353* (2013.01)

(58) Field of Classification Search
USPC .......................................................... 342/21
See application file for complete search history.

(56) References Cited

U.S. PATENT DOCUMENTS

| | | | | |
|---|---|---|---|---|
| 7,663,534 B2* | 2/2010 | Hilsebecher | ........ | G01S 13/347 342/109 |
| 2005/0285773 A1* | 12/2005 | Hartzstein | ........ | G01S 7/032 342/70 |
| 2006/0109169 A1* | 5/2006 | Winter | ........ | G01S 13/345 342/70 |
| 2006/0227316 A1* | 10/2006 | Gatt | ........ | G01S 7/4811 356/5.09 |
| 2008/0021627 A1* | 1/2008 | Johnsson | ........ | B60W 10/06 701/96 |
| 2008/0114510 A1* | 5/2008 | Wilhelm | ........ | B60R 21/0134 701/41 |
| 2009/0201193 A1* | 8/2009 | Hilsebecher | ........ | G01S 13/347 342/109 |
| 2009/0303108 A1* | 12/2009 | Hilsebecher | ........ | G01S 7/352 342/157 |
| 2009/0315761 A1* | 12/2009 | Walter | ........ | G01S 13/345 342/200 |
| 2011/0006944 A1* | 1/2011 | Goldman | ........ | G01S 13/9029 342/25 A |
| 2012/0032838 A1* | 2/2012 | Heilmann | ........ | G01S 7/4004 342/192 |
| 2012/0235854 A1* | 9/2012 | Testar | ........ | G01S 7/35 342/109 |
| 2012/0235884 A1* | 9/2012 | Miller | ........ | G02B 27/0093 345/8 |
| 2013/0278466 A1* | 10/2013 | Owen | ........ | G01S 1/02 342/464 |

FOREIGN PATENT DOCUMENTS

| | | |
|---|---|---|
| DE | 102012008350 A1 | 10/2013 |
| DE | 102012212888 A1 | 1/2014 |
| DE | 102012220879 A1 | 5/2014 |
| JP | 2001166036 A | 6/2001 |
| JP | 2008514936 A | 5/2008 |
| JP | 2012235854 A | 12/2012 |
| JP | 2013113723 A | 6/2013 |
| WO | 2005109033 A1 | 11/2005 |

\* cited by examiner

Fig. 10

METHOD FOR LOCATING AN OBJECT USING AN FMCW RADAR

BACKGROUND INFORMATION

The present invention relates to a method for locating objects using an FMCW radar, in which:
a ramp-shaped frequency-modulated radar signal is transmitted whose modulation pattern has a plurality of successive ramps having different gradients,
received radar echoes are mixed down with the transmitted signal into a baseband,
the baseband signal is recorded ramp-by-ramp and transformed into a respective spectrum,
for each signal peak found in the spectrum, a noise estimation is carried out in order to distinguish between radar targets and noise or clutter, and
by comparing the frequency positions of the mutually corresponding signal peaks in the spectra obtained for various ramp gradients, the distances R and relative velocities v of the radar targets are determined.

In addition, the present invention relates to a radar sensor, in particular for motor vehicles, fashioned in order to carry out this method.

In motor vehicles, FMCW radar sensors are used to acquire the surrounding traffic environment, in particular in order to locate other vehicles. The location results can be used for various assistance functions, for example an automatic distance regulation, automatic collision warning, or automatic triggering of an emergency braking process when there is an acute risk of collision.

The frequency of the baseband signal corresponds to the frequency difference between the signal transmitted at a given time and the signal received at the same time. Based on the frequency modulation of the transmit signal, this frequency difference is a function of the runtime of the signal from the radar sensor to the object and back, and thus of the distance from the object. Due to the Doppler effect, the frequency difference however also contains a portion that is caused by the relative velocity of the object. The measurement of the frequency difference at a single ramp therefore does not yet permit a determination of the distance and of the relative velocity, but rather supplies only a linear relation between these quantities. In a distance/velocity diagram (R-v diagram), this relation can be represented as a straight line. In order to obtain unambiguous values for the distance and the relative velocity, a standard type of FMCW radar works with alternating rising and falling frequency ramps. In this case, in the R-v diagram a different straight line is then obtained for each ramp, and the distance and the relative velocity of the object are given by the point of intersection of these two straight lines.

If, however, a plurality of objects are located at the same time, the frequency spectrum of the baseband signal contains a plurality of peaks for each ramp, one for each object, and in a comparison of the peaks at different ramps it can no longer unambiguously be determined which peak belongs to which object. For example, given the simultaneous location of two objects an R-v diagram is obtained having four straight lines that intersect each other. Only two of the four points of intersection indicate the distances and relative velocities of the two objects, while the two other points of intersection represent so-called "phantom targets."

In order to remove ambiguity, in most cases at least one third frequency ramp is additionally worked with that has a different gradient and supplies a different set of straight lines in the R-v diagram. The genuine objects can then be recognized in that all three straight lines go through the same point. As the number of simultaneously located objects increases, however, the expense of resolving the ambiguities increases. Often, further frequency ramps are used to more easily resolve ambiguities.

An alternative approach to the solution of this problem has also been proposed. Here, a sequence of identical, relatively short frequency ramps, so-called "rapid chirps," is used, which, in relation to their duration, have a large frequency sweep, and are therefore so steep that in the baseband signal the distance-dependent portion dominates, while the Doppler portion represents only a small correction. This correction is determined by following the phase shift of the baseband signal from ramp to ramp. Here, the circumstance is exploited that the phase of the baseband signal reacts relatively sensitively to a small change in the distance from the object, resulting from the relative movement of the object during the short time interval from one frequency ramp to the next.

However, because the phase shift is a periodic function of the relative velocity, the relative velocity can be unambiguously determined only if it is so small that the phase shift is smaller than a half period (i.e., less than n).

Given a use of the FMCW radar in a motor vehicle, the relative velocities can be large enough that, in order nonetheless to obtain unambiguous results, the duration and thus the frequency of repetition of the chirps has to be chosen to be very short. This not only requires more computing power, but also, due to the correspondingly short "observation duration," a greater degree of unsharpness in the distance measurement can result, so that further measures are required in order to obtain sufficiently precise distance values.

In general, in radar location there is the problem that the received radar signals are subject to noise to a greater or lesser degree, and in addition contain radar echoes from objects that are "not of interest," for example guardrail posts, irregularities in the roadway surface, raindrops, and the like. These undesired radar echoes, so-called "clutter," do indeed for the most part have a smaller amplitude than the radar targets that are actually of interest, but can nonetheless make the identification of the genuine radar targets more difficult, in particular if they are situated in the location region of a plurality of radar targets having approximately equal distances and/or relative velocities.

DISCLOSURE OF THE INVENTION

The object of the present invention is therefore to indicate a method that makes it possible to further suppress the disturbing influences of noise and clutter.

According to the present invention, this object is achieved in that
the modulation pattern has at least one group of a plurality of ramps having the same gradient,
for each group of ramps having the same gradient, the baseband signal is transformed into a spectrum in a two-dimensional frequency space in which a first frequency variable $f_k$ represents a sampling index k within each ramp, and a second frequency variable $f_j$ represents a ramp index,
the noise estimation is carried out in both dimensions of the frequency space, and
the determination of the distances R and relative velocities v takes place on the basis of the first frequency variables $f_k$.

In the method according to the present invention, the modulation pattern thus resembles the above-mentioned rapid chirps method, in that here as well a plurality of ramps having the same gradient follow one another immediately in succession. A further resemblance is that in the method according to the present invention as well, the phase shift of the baseband signal is evaluated from ramp to ramp. Mathematically, this means that a two-dimensional Fourier transformation is carried out. In the first dimension, the baseband signal for individual ramps is regarded as a function of time and is subjected to a (one-dimensional) Fourier transformation. In the second dimension, the transformation acts on the totality of the received data for the complete group of successive ramps having the same gradient, and the independent time variable is formed by the ramp index, i.e. the running number of the temporally successive ramps. For each frequency value $f_k$ in the first dimension, in this way a second frequency value f in the second dimension is obtained that indicates with what frequency this frequency component oscillates when the individual ramps are run through one after the other. This second frequency component $f_j$ thus represents the phase shifts of the baseband signal from ramp to ramp, caused by the relative movement of the radar target.

However, according to the present invention this information is not immediately used to determine the relative velocity; rather, the determination of the relative velocity and of the distance takes place, as in a "conventional" FMCW radar, through analysis of the straight lines in the R-v diagram, obtained for ramps having different gradients. The ramps following one another (comparable to the chirps) having the same gradient therefore do not need to meet the above-mentioned unambiguousness criterion, so that in comparison with a rapid chirps method the ramp gradients can be chosen significantly smaller, and the ramp durations can be chosen significantly larger. This results in a significant saving of costs.

According to the method of the present invention, the two-dimensional spectrum is primarily used to make the noise estimation more robust, and thus to suppress the disturbing influences of noise and clutter. Here it is advantageous that in a two-dimensional spectrum each peak is framed not only by two one-dimensional intervals, in which the received signal contains only noise and clutter, but rather is surrounded by a significantly larger annular region, so that noise and clutter can be averaged over a significantly larger area of integration.

If two peaks belonging to genuine radar targets are situated very close to one another in the two-dimensional spectrum, then the second peak provides only a relatively small contribution to the noise environment of the first peak, and vice versa, so that the risk that these peaks will mutually mask one another is significantly less.

A further advantage of the method according to the present invention is that peaks situated close to one another in the two-dimensional spectrum can be separated from one another significantly more simply and more reliably than in a one-dimensional spectrum.

Because the determination of the distances and relative velocities of the genuine radar targets takes place on the basis of the straight lines in the R-v space, in the method according to the present invention a matching procedure is also fundamentally required, which is used to decide which of the peaks obtained in various spectra (for different ramp gradients) belong to the same target. However, the two-dimensional spectra can also contribute to the checking of the results of this matching for plausibility, and/or can exclude implausible matching results from the outset, so that the precision and reliability of the matching can also be improved, and/or the computing expense required for this can be reduced.

Advantageous embodiments of the present invention are described herein.

Below, an exemplary embodiment is explained in more detail on the basis of the figures.

DETAILED DESCRIPTION OF EXAMPLE EMBODIMENTS

Figure 1:
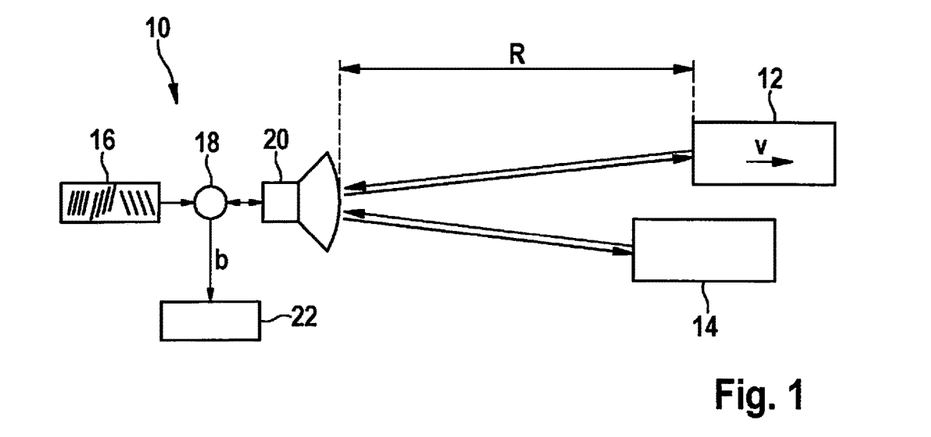
FIG. 1 shows a block diagram of an FMCW radar system.

FIG. 1 shows, as a simplified block diagram, an FMCW radar sensor 10 that is for example installed at the front in a motor vehicle, and is used to measure distances R and relative velocities v of objects 12, 14, for example vehicles traveling in front. Radar sensor 10 has a voltage-controlled oscillator 16 that, via a mixer 18, supplies a frequency-modulated transmit signal to a transceiver device 20, by which the signal is sent out in the direction towards objects 12, 14. The signal reflected by the objects is received by transceiver device 20 and is mixed with a portion of the transmit signal in mixer 18. In this way, a baseband signal b is obtained that is further evaluated in an electronic evaluation and control device 22.

Figure 2:
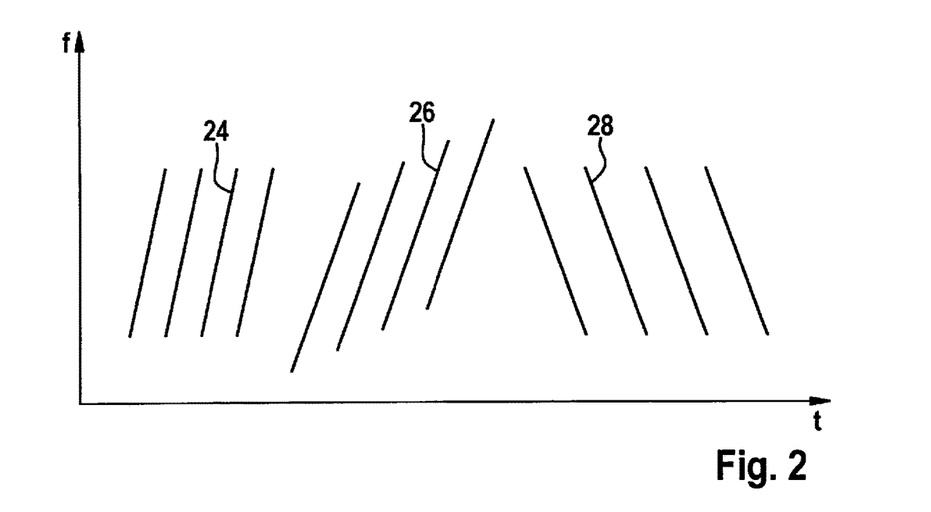
FIG. 2 shows an example of a frequency modulation schema.

FIG. 2 shows an example of a modulation schema of the transmit signal provided by oscillator 16. Frequency f of the transmit signal is here plotted as a function of time t. The frequency is modulated in the form of successive ramps 24, 26, 28. In the depicted example, four identical ramps 24, following one another at identical temporal intervals, are followed by a group of four ramps 26 that have the same gradient but whose center frequency increases somewhat from ramp to ramp. The temporal distances are somewhat greater than for ramps 24. Ramps 26 are followed by a further group of four identical ramps 28 having negative gradient, and having somewhat greater distances from ramp to ramp. This pattern is to be understood only as an illustrative example, and can be modified in many ways. The main thing is only that the modulation pattern contains at least one group of (at least two) ramps having the same gradient, such as for example ramps 24, and moreover at least one ramp having a different gradient, for example also having an opposite sign of the gradient, such as ramps 28. The ramps belonging to the same group do not necessarily have to follow one another immediately. Rather, the groups of ramps 24, 26, and 28 can also be interleaved with one another.

Figure 3:
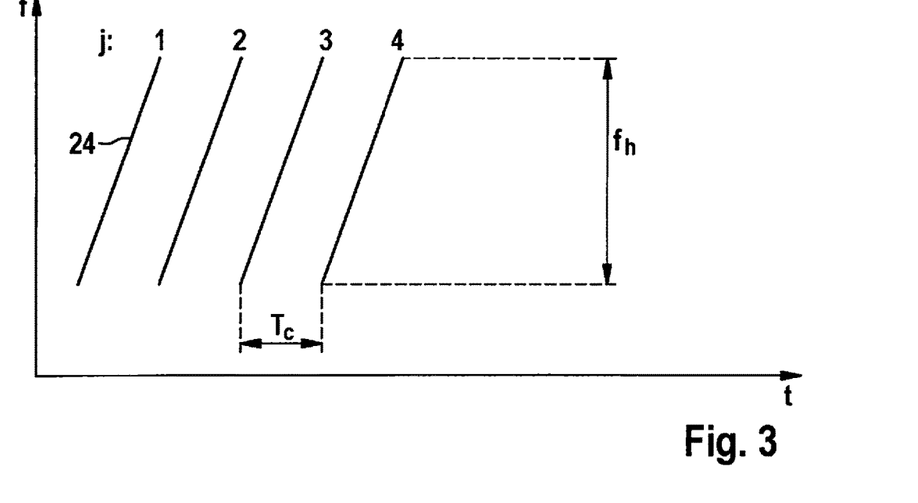
FIG. 3 shows a sequence of ramps having the same gradient in the modulation schema of FIG. 2.

In FIG. 3, ramps 24 are again shown separately, and are progressively numbered with an index j. The center frequency of the transmit signal is on the order of magnitude of 76 GHz, and the frequency sweep $f_h$ by which the frequency changes in the run of each ramp is on the order of magnitude of some megahertz. The temporal distance $T_C$ by which ramps 24 follow one another is on the order of magnitude of some milliseconds, and is thus greater, by a factor of 10-100, than in a typical rapid chirp method. Because in the depicted example ramps 24 follow one another without pause, $T_C$ at the same time indicates the ramp duration.

The frequency of baseband signal b corresponds to the frequency difference between the transmit signal forwarded by mixer 18 to transceiver device 20 and the signal that, after being reflected by objects 12, 14, is received by transceiver device 20 and again arrives at mixer 18. This frequency difference is additively made up of a distance-dependent portion $f_R$ and a velocity-dependent portion $f_v$. Distance-dependent portion $f_R$ results from the frequency modulation, and in the example shown here is given by:

$$f_R = 2\, R\, f_h / c\, T_C \quad (1)$$

where c is the speed of light. The velocity-dependent portion results from the Doppler effect, and is approximately given by:

$$f_v = 2\, f\, v / c \quad (2)$$

Figure 4:
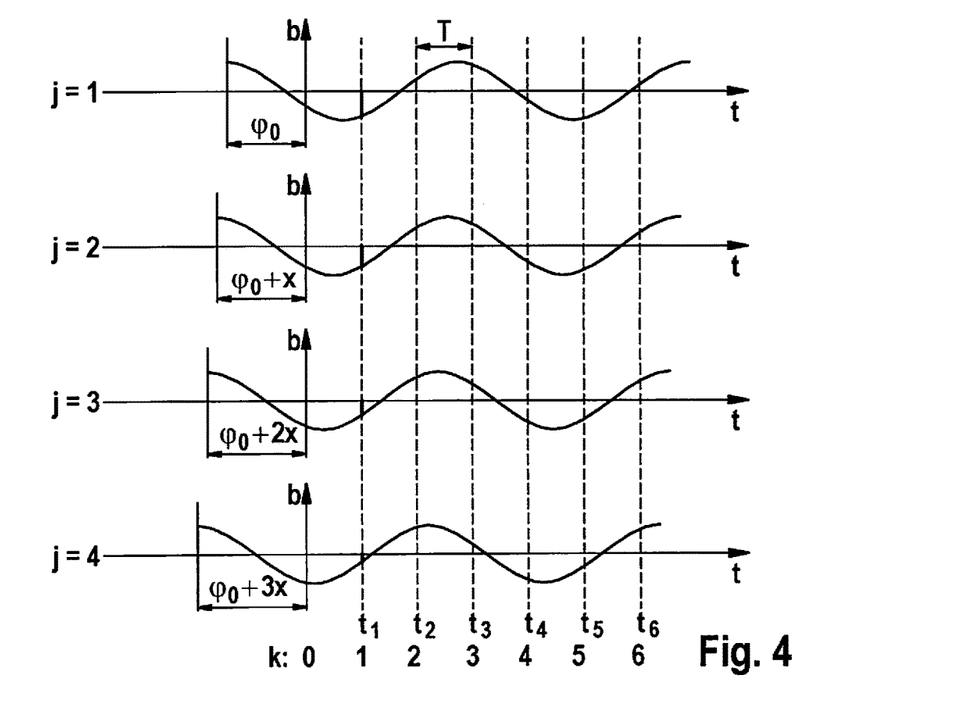
FIG. 4 shows a sequence of baseband time signals for the ramps shown in FIG. 3.

In FIG. 4, under the assumption that only a single object is being located, baseband signals b are shown for the first four ramps j=1 through j=4, as functions of time t (time signals). In evaluation and control device 22, the time signal, supplied by mixer 18 as an analog signal, is periodically, at sampling times t1, t2, . . . , sampled, digitized, filtered using a suitable window function, and stored. The sampling times are synchronized with the modulation ramps of the transmit signal, and are numbered within each ramp using the index k. The sampling period, i.e. the temporal distance between the individual sampling times, is designated T.

Using fast Fourier transformation (FFT), the time signal for each ramp can be converted into a spectrum that indicates the (complex) amplitude of the baseband signal as a function of the frequency $f_k$.

Under the assumption that only a single object is present, the spectrum recorded for a single ramp has a sharp peak at the frequency $f_k = f_R + f_v$. Due to the small temporal spacing $T_C$ of the ramps, the frequencies $f_R + f_v$ remain practically unchanged.

If, however, the relative philosophy of the object is not equal to zero, then the slight change in distance of the object occurring within ramp duration $T_C$ causes a phase shift of the baseband signal, as is shown in FIG. 4. From ramp to ramp, the phase increases in each case by a determinate amount x. If $\varphi_0$ designates the phase at the first ramp (j=1), then the phase at the second ramp (j=2) has the value $\varphi_0 + x$, and at the third ramp (j=3) has the value $\varphi_0 + 2x$, and so on.

In general, the baseband signal b can be described as a function of the sampling index k and the ramp index j as follows:

$$s(k, j) = Re(\exp(i(\varphi_0 + 2\pi(f_R + f_v)k\, T + 2\pi f_v\, j\, T_C))) \quad (3)$$

The term $(f_R + f_v)\, k\, T$ represents the runtime and Doppler effects within a single ramp. The term $f_v\, j\, T_C$ represents the effect of the slight change in the object distance from ramp to ramp, and is a function only of the velocity-dependent portion $f_v$ (the Doppler frequency). The value $\varphi_0$ is a phase offset, given by $$\varphi_0 = 4\pi\, R\, f_m / c \quad (4)$$

where $f_m$ is the center frequency of the frequency ramp.

If, as in FIG. 4, a Fourier transformation is carried out respectively only within an individual ramp (via the index k with fixed j), then the term $f_v\, j\, T_C$ in equation (3) provides only a contribution x, 2x, . . . , to the phase in each case.

Figure 5:
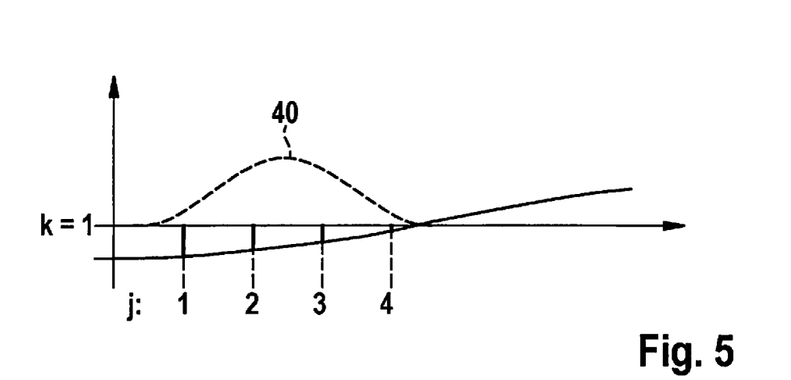
FIG. 5 shows a longitudinal section of the time signals of FIG. 4.

However, a Fourier transformation can also be carried out over a "longitudinal section" of the time signals, by holding constant the sampling index k and carrying out the fast Fourier transformation over the running ramp index j. In FIGS. 4 and 5, this is shown symbolically for the sampling index k=1. In FIG. 4, the function values are shown for sampling time t1 as thick columns. The same columns are also shown in FIG. 5. However, here they are plotted against ramp index j. Due to the phase offset from ramp to ramp, a periodic function is in turn obtained that can be subjected to a Fourier transformation.

These Fourier transformations, which can be carried out for each k, provide, for an individual object, a peak at Doppler frequency $f_v$.

Figure 6:
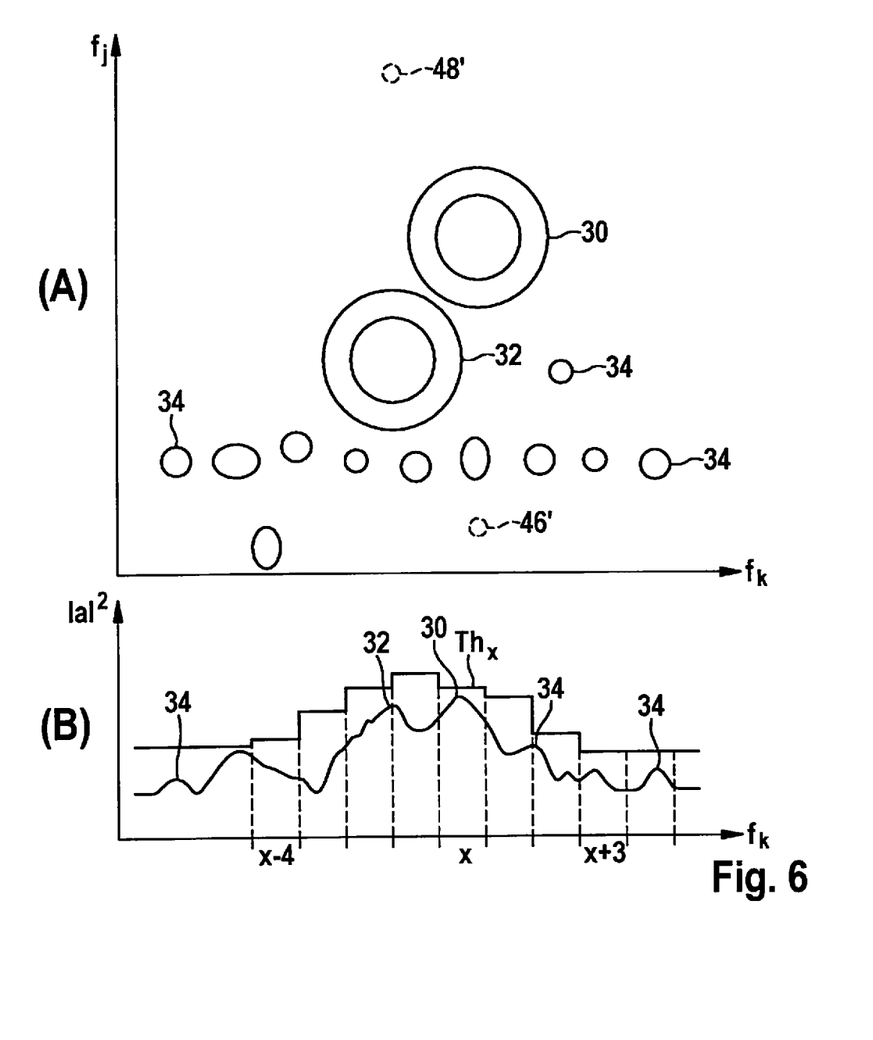
FIG. 6 shows an example of a two-dimensional spectrum of the time signals in FIGS. 4 and 5, as well as an associated one-dimensional partial spectrum.

If, as in the example under consideration here, the time distance between the ramps and also the frequency difference from ramp to ramp is identical, then a particularly elegant evaluation method can be applied, in which the above-described Fourier transformations are combined to form a so-called two-dimensional Fourier transformation. Here, the time signals obtained for the successive ramps 24 are transformed into a two-dimensional frequency space whose coordinates are frequencies $f_k$ and $f_j$, as is shown in FIG. 6(A). Frequency $f_k$ is the frequency variable in a series of first (one-dimensional) Fourier transformations, in which in each case ramp index j is held fixed and transformation takes place over k, and the frequency $f_j$ is the frequency variable of second Fourier transformations, in which in each case $f_k$ is held fixed and transformation takes place over j. According to Equation (3), $f_j$ corresponds to Doppler frequency $f_v$, and $f_k$ corresponds to the sum $f_R + f_v$.

If, for Doppler frequency $f_v$, the unambiguousness condition $$|f_v| < 1/2T_C \quad (5)$$

according to the Shannon sampling theorem were to be met, then in this two-dimensional frequency space the distances and relative velocities of the radar targets could be immediately read off. However, in the method described here the temporal distances $T_C$ of the ramps are selected to be large enough that it cannot be presupposed that the unambiguousness condition is always met. Rather, here the two-dimensional Fourier transformation is used to suppress the disturbing influences of noise and clutter, as is explained below on the basis of FIGS. 5 through 9.

In FIG. 6(A), in the two-dimensional frequency space two peaks 30, 32 of two (genuine) radar targets are shown as concentric circles that are intended to symbolize the "height lines" of these peaks. In addition, smaller circles and ellipses are shown that are intended to symbolize the so-called clutter 34, i.e. signals from disturbing objects such as guardrail posts, irregularities in the ground surface, and the like. The majority of these clutter objects will be stationary objects, i.e. objects whose relative velocity corresponds to the inherent velocity of the vehicle equipped with the radar sensor. Accordingly, these peaks have the same (negative)

Doppler frequency, and in FIG. 6(A) they lie on a horizontal straight line having constant $f_j$.

FIG. 6(B) shows, for the same situation, one of the spectra obtained for the first Fourier transformation over a single one of the ramps 24. The two peaks 30 and 32 are here fused to form almost a single peak, and stand out less clearly from the noise background and from clutter 34.

Various conventional methods make it possible to distinguish, in one- and two-dimensional spectra, between peaks 30, 32 belonging to genuine radar targets (and which are therefore in general higher) on the one hand, and those belonging to clutter 34 and the noise background on the other hand. A standard class of such methods are the so-called CFAR (Constant False Alarm Rate) methods, in which a peak is classified as a genuine radar target if its height is above a determined threshold value, and in which the threshold value is varied as a function of the level of the background signal.

For the one one-dimensional case, such a method is shown in FIG. 6(B). The frequency space (frequencies $f_k$) are divided into cells of equal size, and in order to determine the threshold value $Th_x$ for an individual cell x (x being a running number of the cells), a window is placed over the frequency space that contains in the center the cell x to be investigated, as well as a determined number of neighboring cells, for example the cells from x−4 to x+4. For each cell within the window, the signal power is then determined, i.e. the integral over the square of the absolute value $|a|^2$ of the complex amplitude. The threshold value $Th_x$ is then a particular statistical function of the powers in the neighboring cells, i.e. here the cells x−4 to x−1 and x+1 to x+4.

In the simplest case, the statistical function is simply the mean value with equal weighting of all neighboring cells. If the noise and the clutter are uniformly distributed, and only a single genuine target is present, then a uniform threshold value is obtained for the overall frequency space, and if the peak is above this threshold value it is evaluated to be a genuine radar target. If, however, as in the example shown in FIG. 6(B), two peaks 30, 32 lie close to one another, then, if the threshold value $Th_x$ is determined for cell x (peak 30), the neighboring peak 32 results in an increase of the average power, and thus an increase of the threshold value $Th_x$. In some circumstances, the threshold value here is increased far enough that peak 30 no longer exceeds the threshold value; in other words, peak 30 is masked by adjacent peak 32. Conversely, peak 32 can also be masked by peak 30, as is shown as an example in FIG. 6(B).

This masking problem can be alleviated within certain limits by using more suitable statistical functions in the CFAR method. Preferred are so-called OS-CFAR methods (OS: Ordered Statistics), in which the neighboring cells are ordered according to the height of the signal level, and the threshold value is then determined as a function of the height of the level for a particular ordinal number, for example as a function of the median.

Figure 7:
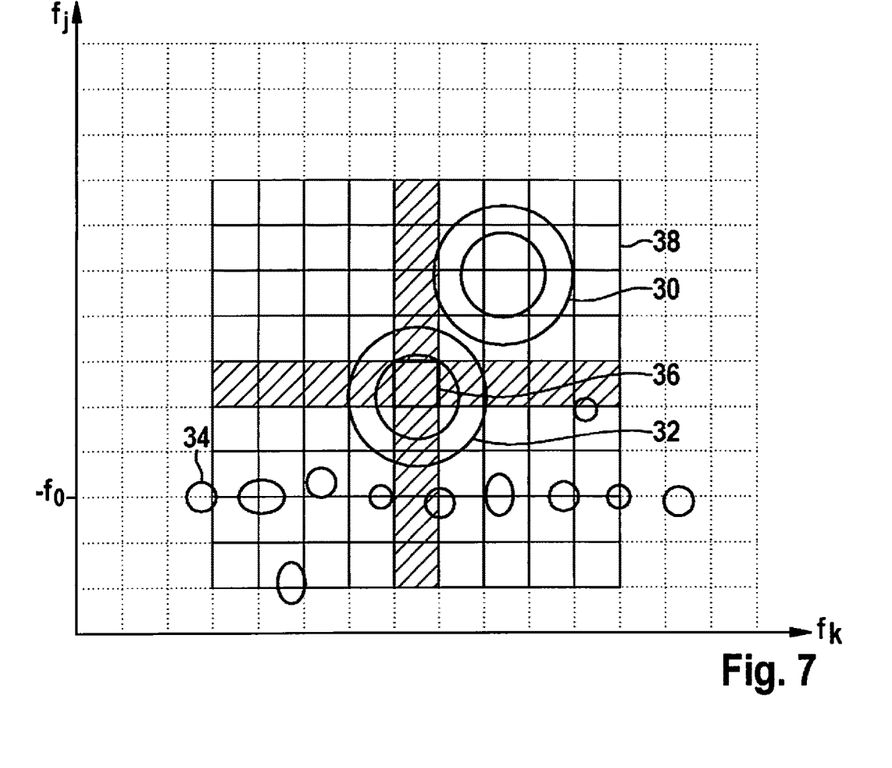
FIG. 7 shows a diagram illustrating a two-dimensional noise estimation.

FIG. 7 illustrates the generalization of such CFAR methods to the two-dimensional frequency space. As an example, here the determination of the threshold value is shown for a cell 36, situated approximately at the apex of peak 32. Around this cell 36 is placed a window 38, which in the depicted example is made up of 7×7 cells. To determine the threshold value for cell 36, the signal level can then for example be evaluated in all 48 cells of window 38 (with the exception of cell 36). In a different specific embodiment, only those cells are evaluated that are shown with hatching in FIG. 7, i.e., the immediate and non-immediate neighbors only in the coordinate directions $f_k$ and $f_j$.

FIG. 7 immediately shows that no matter which statistical function is selected for the determination of the threshold value for cell 36, the statistical weight of clutter 34, and above all also of neighboring peak 30, will be significantly smaller than in the one-dimensional case shown in FIG. 6(B). Correspondingly, peaks 30 and 32 stand out more clearly from the clutter, and the problem of mutual masking is significantly alleviated.

A further effect that results in a suppression of the clutter is connected with the so-called "windowing" to which the time signals shown in FIGS. 4 and 5 are subjected before the Fourier transformation. If the time signal is a pure sine signal having a particular frequency, and if the ramp duration, i.e. the time over which the time signal is recorded, were infinitely long, then an ideal, infinitely sharp peak would be obtained at the relevant frequency. However, in practice the finite ramp duration has the result that this peak is spread, and in the spectrum side lobes occur at each side of the main maximum. This effect cannot be completely suppressed, but the shape of the side lobes can be influenced by filtering the time signal using a suitable window function, for example multiplying it.

The same holds for the second transformation step, in which transformation takes place over ramp index j. For this case, in FIG. 5 an example of a window function 40 is shown that has the result that the spectra having ramp indices 2 and 3 are more strongly weighted than are the spectra having indices 1 and 4.

Figure 8:
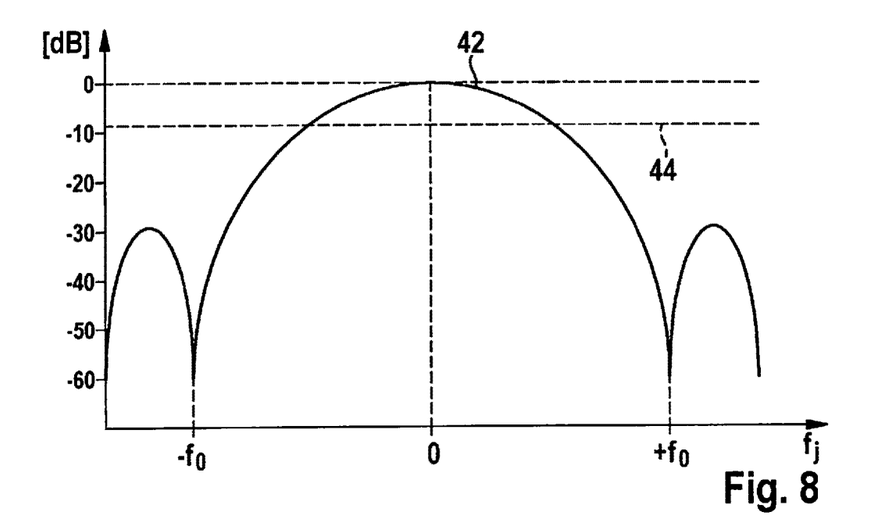
FIG. 8 shows an attenuation curve for a window function applied to the longitudinal section of FIG. 5.

In FIG. 8, for a specific window function 40 (Chebyshev 30 dB) the associated attenuation function 42 is shown, which indicates how, using this window, the shape of the spectrum obtained in the second Fourier transformation (frequency variable $f_j$) is modified. This attenuation function 42 is the Fourier transform of window function 40. It will be seen that frequency portions at both sides of frequency $f_j=0$ (Doppler frequency 0) are suppressed until, at a particular frequency $\pm f_0$, a minimum is reached beyond which a side lobe follows. The mean value of attenuation function 42 is shown in FIG. 8 as a horizontal line 44, and is situated at an attenuation level of 8.5 dB.

If it is assumed that the relative velocities of the clutter objects are statistically equally distributed, then as a consequence an attenuation of the clutter by 8.5 dB would result at the statistical mean. If it is taken into account that most clutter objects are stationary objects, and will accordingly have a negative Doppler frequency differing from zero corresponding to the inherent velocity of the vehicle, then in practice there results an even stronger average suppression of the clutter. Optionally, this effect can be further optimized by varying the window function 40 as a function of the respective inherent velocity of the vehicle in such a way that the minimum at $-f_0$ corresponds precisely to the Doppler frequency associated with this inherent velocity (see FIG. 7). The stationary clutter objects would then to some extent "disappear" in this minimum.

Figure 9:
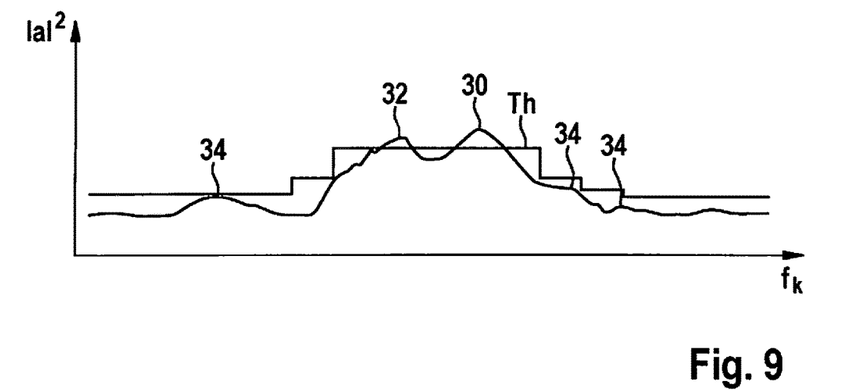
FIG. 9 shows a one-dimensional spectrum analogous to the partial spectrum in FIG. 6, having threshold values for a noise estimation according to the method of the present invention.

The result of these effects, which contribute to a suppression of the clutter, is illustrated in FIG. 9, which shows a one-dimensional spectrum having frequency variables $f_k$. Differing from FIG. 6(B), however, here the spectrum is not shown that was actually obtained for an individual ramp 24; rather, a fictive spectrum is shown that is obtained by integrating over $f_j$ for each frequency value $f_k$ in the two-dimensional spectrum shown in FIG. 6(A). Due to the attenuation achieved through the windowing, in FIG. 9 the peaks for clutter 34 are clearly less pronounced than in FIG. 6(B). The step-shaped curve Th in FIG. 9 shows the threshold values that were obtained through the two-dimensional CFAR method according to FIG. 7. In the region of peaks 30 and 32, the threshold value is significantly lowered compared to FIG. 6(B), so that peaks 30 and 32 are now raised above the threshold value, and are no longer masked. In this way, given an unchanged "false alarm rate," the recognition of genuine radar targets is significantly improved.

In addition, the analysis of the two-dimensional spectrum in FIG. 7 makes it possible to more clearly and more reliably separate from one another peaks 30, 32 that are situated close to one another.

In an advantageous specific embodiment, the method described above is repeated for each of the remaining groups of ramps 26 and 28 in FIG. 2, so that in the evaluation of these groups of ramps as well a better suppression of the clutter and a sharper distinguishing of the targets is achieved. The determination of the relative velocities and distances of the located targets then takes place in a known manner through matching of the peaks obtained for the various groups of ramps 24, 26, 28 in the R-v space, as is shown in FIG. 10.

In FIG. 7, peak 30 is at a particular frequency $f_k$, which corresponds to the sum of distance-dependent frequency portion $f_R$ and velocity-dependent frequency portion $f_v$. The frequency value $f_k$ obtained for peak 30 thus characterizes a particular relation between distance R and the relative velocity v of the relevant radar target. In FIG. 10, this relation is represented by a straight line 30a. Correspondingly, for peak 32 a straight line 32a is obtained. The gradient of these straight lines 30a and 32a is a function only of the gradient of ramp 24. As a result, the two straight lines are parallel.

Figure 10:
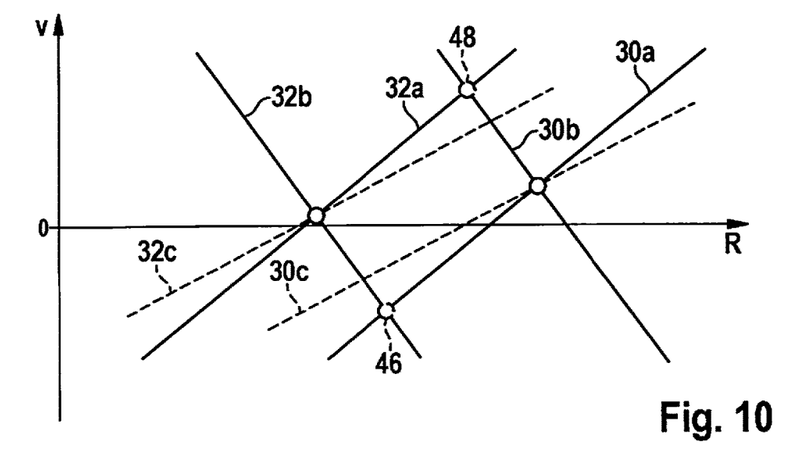
FIG. 10 shows an R-v diagram.

Correspondingly, the evaluation of the group of falling ramps 28 (FIG. 2) for the same radar targets yields two falling straight lines 30b and 32b in FIG. 10. In FIG. 10, the values for distance R and relative velocity v of the two located targets have to lie at the points of intersection of the four straight lines 30a, 32a, 30b, and 32b. However, it is not immediately clear which of the total of four points of intersection represent the two genuine radar targets. In order to resolve this ambiguity, up to now it has been standard to evaluate a further group of ramps 26 having a different gradient. These ramps then supply a further pair of straight lines 30c, 32c, shown in broken lines in FIG. 10. Three straight lines 30a, 30b, and 30c, or, respectively, 32a, 32b, and 32c, intersect at the same point only for the genuine radar targets, and this point then indicates the relative velocity and the distance of the relevant object.

As the number of simultaneously located targets increases, the matching method described above will however become increasingly more complex and susceptible to error.

However, the present invention provides the advantageous possibility of making the matching method simpler and more robust through additional plausibility tests. For example, in FIG. 10 the point of intersection between straight lines 30a and 32b represents a phantom target 46 that does not correspond to a genuine radar target. This phantom target 46 then however has a particular distance R and a particular relative velocity v, so that this phantom target can also be assigned to a particular location 46' in the two-dimensional frequency space in FIG. 6(A). If no peak can be found in the two-dimensional spectrum at this location 46', then phantom target 46 in FIG. 10 can be immediately discarded.

Correspondingly, in the example shown here it is also possible to eliminate a further phantom target 48 in FIG. 10, corresponding to the point of intersection of straight lines 32a with straight lines 30b. In FIG. 6(B), this phantom target corresponds to a location 48' at which, likewise, no significant peak is to be found.

What is claimed is:

1. A method for locating objects using an FMCW radar, the method comprising:
transmitting a ramp-shaped frequency-modulated radar signal whose modulation pattern has a plurality of successive ramps having different gradients, wherein the modulation pattern has at least one group of a plurality of ramps having the same gradient;
mixing down received radar echoes with the transmitted signal into a baseband;
recording the baseband signal ramp-by-ramp and transforming each into a respective spectrum, wherein for each group of ramps having the same gradient, the baseband signal is transformed into a spectrum in a two-dimensional frequency space in which a first frequency variable represents a sampling index within each ramp, and the second frequency variable represents a ramp index, and wherein in a two-dimensional spectrum each peak is framed by two one-dimensional intervals, in which the received signal contains only noise and clutter, and which is surrounded by a larger annular region, so that noise and clutter is averaged over a larger integration area;
performing, for each signal peak found in the spectrum, a noise estimation to distinguish between radar targets and noise or clutter, wherein the noise estimation is performed in both dimensions of the frequency space; and
determining distances and relative velocities of the radar targets by comparing frequency positions of the mutually corresponding signal peaks in the spectra obtained for various ramp gradients, wherein the determination of the distances and relative velocities takes place based on the first frequency variables;
wherein for the determination of the distances and relative velocities based on the first frequency variables, the signal peaks found for groups of ramps having different gradients having a different sign are assigned to one another, and for the identification of phantom targets resulting from false assignments, the locations in the two-dimensional spectrum corresponding to these phantom targets are checked.

2. The method as recited in claim 1, wherein the noise estimation is a two-dimensional CFAR estimation.

3. The method as recited in claim 2, wherein the noise estimation is an OS-CFAR estimation.

4. The method as recited in claim 1, wherein a separation of signal peaks situated close to one another takes place based on the position of these signal peaks in the two-dimensional frequency space.

5. The method as recited in claim 1, wherein the baseband signals for the ramps having the same gradient are filtered using a window function that is a non-constant function of the ramp index.

6. The method as recited in claim 5, wherein the FMCW radar is in a motor vehicle, and wherein the window function being varied as a function of the inherent velocity of the motor vehicle.

7. An FMCW radar sensor, comprising:
a control and evaluation device, including a radar sensor having a processor configured to perform the following:
transmitting, via a transceiver device, a ramp-shaped frequency-modulated radar signal whose modulation pattern has a plurality of successive ramps having different gradients, wherein the modulation pattern has at least one group of a plurality of ramps having the same gradient;

mixing down, via a mixer received radar echoes with the transmitted signal into a baseband;

recording the baseband signal ramp-by-ramp and transforming each into a respective spectrum, wherein for each group of ramps having the same gradient, the baseband signal is transformed into a spectrum in a two-dimensional frequency space in which a first frequency variable represents a sampling index within each ramp, and the second frequency variable represents a ramp index, and wherein in a two-dimensional spectrum each peak is framed by two one-dimensional intervals, in which the received signal contains only noise and clutter, and which is surrounded by a larger annular region, so that noise and clutter is averaged over a larger integration area;

performing, via the processor, for each signal peak found in the spectrum, a noise estimation to distinguish between radar targets and noise or clutter, wherein the noise estimation is carried out in both dimensions of the frequency space; and determining, via the processor, distances and relative velocities of the radar targets by comparing frequency positions of the mutually corresponding signal peaks in the spectra obtained for various ramp gradients, wherein the determination of the distances and relative velocities takes place based on the first frequency variables;

wherein for the determination of the distances and relative velocities based on the first frequency variables, the signal peaks found for groups of ramps having different gradients having a different sign are assigned to one another, and for the identification of phantom targets resulting from false assignments, the locations in the two-dimensional spectrum corresponding to these phantom targets are checked.

* * * * *